(12) United States Patent
Trifonoff

(10) Patent No.: US 11,535,305 B2
(45) Date of Patent: Dec. 27, 2022

(54) VEHICLE BODY STRUCTURE

(71) Applicant: Nissan North America, Inc., Franklin, TN (US)

(72) Inventor: Nicholas Trifonoff, Commerce Township, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/332,896

(22) Filed: May 27, 2021

(65) Prior Publication Data
US 2022/0379971 A1 Dec. 1, 2022

(51) Int. Cl.
| | | |
|---|---|---|
| *B62D 25/08* | (2006.01) | |
| *B62D 25/12* | (2006.01) | |
| *B60R 13/04* | (2006.01) | |
| *B60J 5/10* | (2006.01) | |
| *B62D 25/02* | (2006.01) | |

(52) U.S. Cl.
CPC .............. *B62D 25/12* (2013.01); *B60J 5/102* (2013.01); *B60R 13/043* (2013.01); *B62D 25/025* (2013.01); *B62D 25/087* (2013.01)

(58) Field of Classification Search
CPC .... B62D 25/025; B62D 25/08; B62D 25/087; B62D 25/2027; B62D 25/12; B62D 21/02; B62D 21/03; B60R 13/04; B60J 5/101
See application file for complete search history.

(56) References Cited

U.S. PATENT DOCUMENTS

| | | | |
|---|---|---|---|
| 8,973,965 | B2 | 3/2015 | Zalan et al. |
| 11,413,943 | B2* | 8/2022 | Kang ................... B62D 25/087 |
| 2004/0066061 | A1* | 4/2004 | Engels .................... B60R 19/18 |
| | | | 296/193.08 |
| 2013/0001986 | A1 | 1/2013 | Takenaka |
| 2014/0054928 | A1* | 2/2014 | Narahara ............. B62D 25/087 |
| | | | 296/193.08 |
| 2015/0343953 | A1* | 12/2015 | Stanczak ................ B60N 2/206 |
| | | | 296/24.44 |
| 2017/0210428 | A1* | 7/2017 | Hallik .................... B62D 25/04 |
| 2018/0273107 | A1* | 9/2018 | Shigeta ................. B62D 25/08 |
| 2019/0308575 | A1* | 10/2019 | Kashiwazaki .......... B60R 19/24 |
| 2020/0377160 | A1* | 12/2020 | Jung .................... B62D 43/002 |

(Continued)

FOREIGN PATENT DOCUMENTS

| | | |
|---|---|---|
| DE | 102006050144 A1 | 4/2008 |
| JP | 2717275 B2 | 2/1998 |
| JP | 4300860 B2 | 7/2009 |

*Primary Examiner* — Gregory A Blankenship
(74) *Attorney, Agent, or Firm* — Global IP Counselors, LLP

(57) ABSTRACT

A vehicle body structure defines a vehicle longitudinal direction and a vehicle lateral direction perpendicular to the vehicle longitudinal direction and includes a rear sill structure. The rear sill assembly at least partially defines a rear opening of the vehicle body structure. The rear sill assembly extends in the vehicle lateral direction. The rear sill assembly includes a first body panel and a second body panel. The first body panel extends from a first side of the rear opening to a second side of the rear opening. The second body panel overlays a portion of the first body panel. The second body panel has a main section that includes a plurality of recessed rib portions that extend in directions that define an acute angle relative to the vehicle longitudinal direction.

20 Claims, 6 Drawing Sheets

(56) References Cited

U.S. PATENT DOCUMENTS

2021/0061369 A1\* 3/2021 Kim ................ B62D 25/20
2021/0362571 A1\* 11/2021 Kang ............ B62D 33/0273
2022/0242488 A1\* 8/2022 Park ............... B62D 21/152

\* cited by examiner

VEHICLE BODY STRUCTURE

BACKGROUND

Technical Field

The present disclosure generally relates to a rear sill structure of a vehicle structure. More specifically, the present disclosure relates to a rear sill structure that includes a concealed body panel with diagonal stiffening ribs that extend in directions that define acute angles relative to a vehicle longitudinal direction of the vehicle body structure.

Background Information

As vehicle designers seek to reduce the overall weight of vehicle in order to improve fuel efficiency, the thicknesses of various non-critical metallic body panels in some vehicle designs are reduced. Some body panels with reduced thicknesses can experience a phenomenon referred to as "oil canning" For example, in response to a temporary application of force on a metal panel member, a portion of the metal panel member flexes or deflects, making a distinct popping sound similar to squeezing a can. Upon release of the force, the metal panel member unflexes and returns to its original shape, making another distinct popping sound. Since the deflection of the metal member and return to is original shape causes a noise that sounds like the squeezing of a can, the sound is referred to as an "oil canning" sound.

SUMMARY

One object of the present disclosure is to provide metallic panels with design features that reduce and/or eliminate the phenomenon referred to as "oil canning".

In view of the state of the known technology, one aspect of the present disclosure is to provide a vehicle body structure with a rear sill structure. The vehicle body structure defines a vehicle longitudinal direction and a vehicle lateral direction perpendicular to the vehicle longitudinal direction. The rear sill assembly at least partially defines a rear opening of the vehicle body structure. The rear sill assembly extends in the vehicle lateral direction. The rear sill assembly includes a first body panel and a second body panel. The first body panel extends from a first side of the rear opening to a second side of the rear opening. The second body panel overlays a portion of the first body panel. The second body panel has a main section that includes a plurality of recessed rib portions that extend in directions that define an acute angle relative to the vehicle longitudinal direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
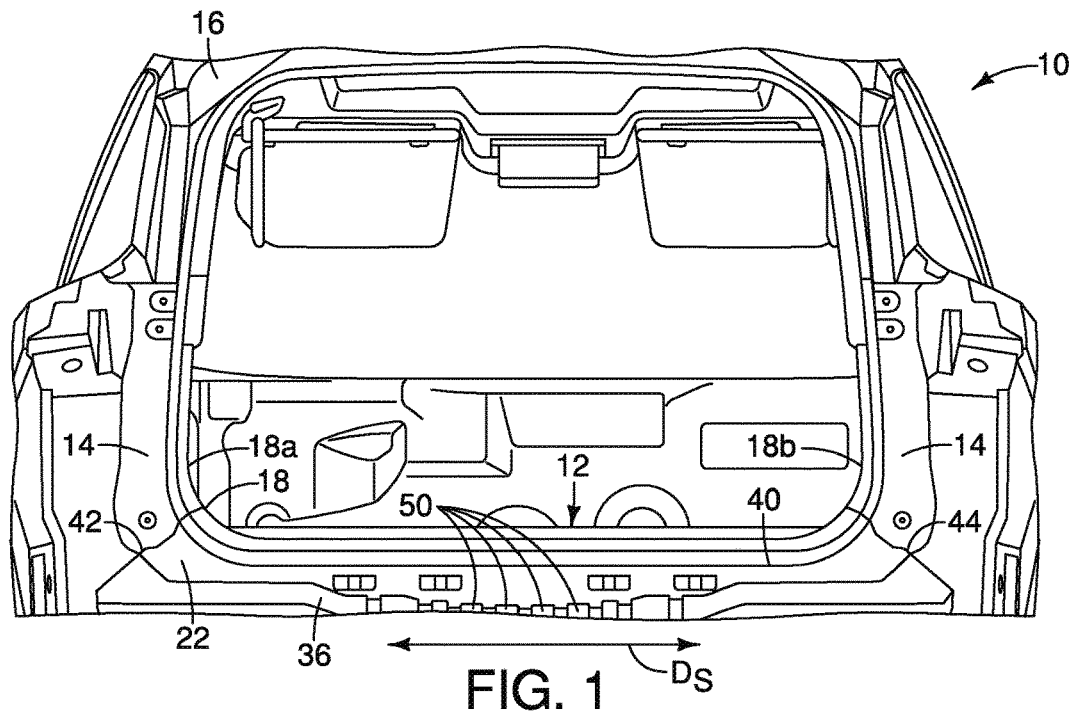
FIG. 1 is a rear view of a vehicle body structure with various body panels removed and a vehicle rear door in an open orientation, showing a rear opening and rear sill assembly in accordance an exemplary embodiment.

Referring initially to FIG. 1, a vehicle body structure 10 that includes a rear sill assembly 12, is illustrated in accordance with a first embodiment. Various elements have been removed from the vehicle body structure 10 in the depiction of the vehicle body structure 10 in FIG. 1. For example, a bumper assembly B (FIG. 2) has been removed to show features of the rear sill assembly 12. The bumper assembly B can include an energy absorbing member covered by a fascia panel shaped to correspond to the design of the vehicle body structure 10 in a conventional manner. Since bumper assemblies are conventional structures well known in the automotive arts, further description of the bumper assembly B is omitted for the sake of brevity.

The vehicle body structure 10 includes, among other structures and features, side panels 14 and a roof structure 16. The side panels 14, the roof structure 16 and the rear sill assembly 12 together surround and define a rear opening 18. A rear door 20 (not shown in FIG. 1) is attached to the vehicle body structure 10 along the roof structure 16 and is movable between an open orientation (FIG. 1) exposing the rear opening 18 and interior elements of the vehicle body structure 10 and a closed orientation (FIG. 2) covering the rear opening 18.

Figure 2:
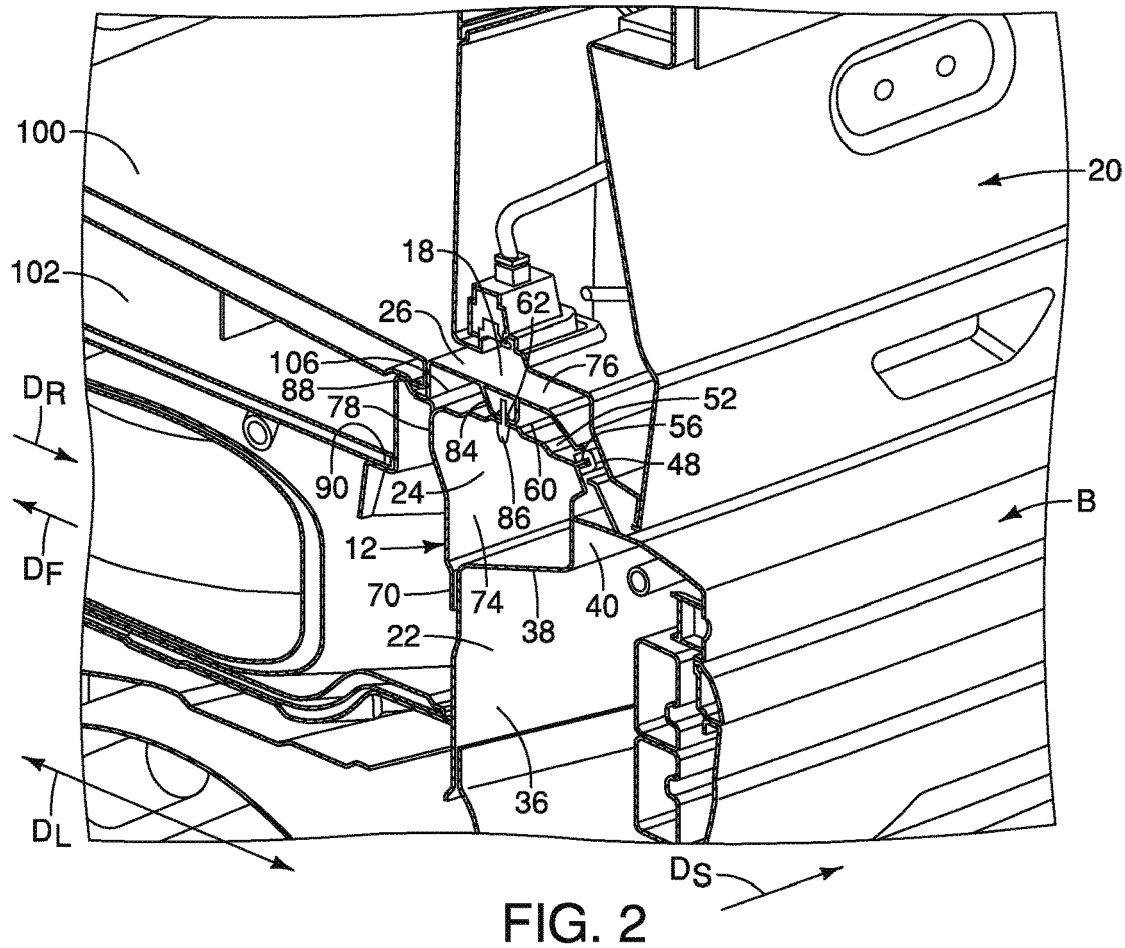
FIG. 2 is a perspective cross-sectional view of a rear portion of the vehicle body structure showing a first body panel, a second body panel and a trim panel of the sill assembly of the vehicle body structure in accordance with the exemplary embodiment.

The vehicle body structure 10 further defines a vehicle forward direction $D_F$, a vehicle rearward direction $D_R$, a vehicle longitudinal direction $D_L$, as shown in FIG. 2, and a vehicle lateral direction $D_S$ (also referred to as a vehicle side-to-side direction), as shown in FIGS. 1 and 2. The vehicle lateral direction $D_S$ is perpendicular to the vehicle longitudinal direction $D_L$.

As shown in FIGS. 3-13 (removed from the vehicle body structure 10), the rear sill assembly 12 includes a first body panel 22, a second body panel 24, attachment brackets 28, upright brackets 30 and reinforcement brackets 32. The first body panel 22, the second body panel 24, the trim panel 26, the attachment brackets 28, the upright brackets 30 and the reinforcement brackets 32 are preferably all made of a metal materials, for example, shaped sheet metal. The trim panel 26 can be made of a metal material but can also be made of a resilient material similar or the same as a bumper fascia member, The rear sill assembly 12 at least partially defines the rear opening 18 and generally extends in the vehicle lateral direction $D_S$.

As shown in FIGS. 3-13, the first body panel 22 has a downwardly extending portion 36, a horizontally extending portion 38, a rearward portion 40, a first lateral edge 42, a second lateral edge 44 and an upper edge 48. The horizontally extending portion 38 extends rearwardly from an upper portion of the downwardly extending portion 36. Stiffening ribs 50 are formed on the horizontally extending portion 38 and curve downward and further extend downward along a portion of the downwardly extending portion 36. The rearward portion 40 extends upward from a rearward area of the horizontally extending portion 38. The upper edge 48 is defined along the top of the rearward portion 40 defining a lower end of the rear opening 18.

The first body panel 22 extends from a first side 18a of the rear opening 18 to a second side 18b of the rear opening 18 between the two side panels 14. Specifically, the first lateral edge 42 joins with and optionally overlaps a lower area of the adjacent side panel 14 at the first side 18a of the rear opening 18. Similarly, the second lateral edge 44 joins with and optionally overlaps a lower area of the adjacent side panel 14 at the second side 18b of the rear opening 18. The first lateral edge 42 and the second lateral edge 44 are, for example, welded to the respective one of the side panels 14.

As shown in FIGS. 3, 8, 10 and 12-13, a plurality of attachment brackets 28 are welded to or otherwise fixed to the rearward portion 40 of the first body panel 22 in order to support an energy absorbing member and/or a bumper fascia of the bumper assembly B.

As shown in FIGS. 3-4 and 6-11, the second body panel 24 includes a main section 52, a downwardly extending section 54 and a rearward section 56. The main section 52 includes a plurality of recessed rib portions 58 and a plurality of raised areas 60, each raised area 60 having an attachment opening 62. Thus, the main section 52 of the second body panel 24 includes the plurality of raised portions 60 with a plurality of attachment openings 62 being defined by corresponding ones the plurality of raised portions 60.

Figure 10:
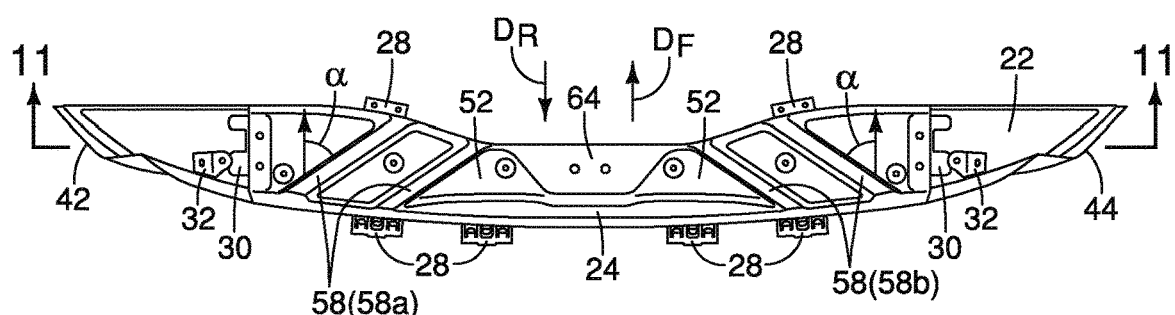
FIG. 10 is a top view of the rear sill assembly removed from the vehicle body structure showing the plurality of recessed rib portions and the plurality of raised areas and further showing acute angles defined between a longitudinal direction of the vehicle body structure each of the plurality of recessed rib portions in accordance with the exemplary embodiment.
Figure 11:
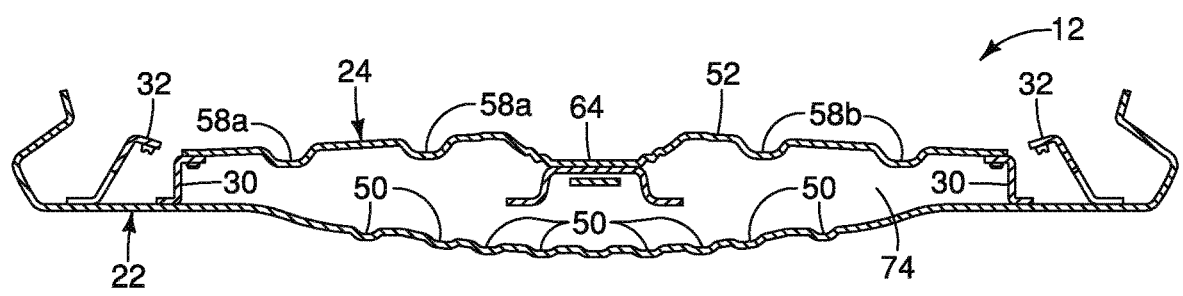
FIG. 11 is a cross-sectional view of the first panel and second body panel of the rear sill assembly taken along the line 11-11 in FIG. 10, showing the plurality of recessed rib portions and the latch striker attachment area in accordance with the exemplary embodiment.

As shown in FIG. 10, the plurality of recessed rib portions 58 extend in directions that define an acute angle $\alpha$ relative to the vehicle longitudinal direction $D_L$. The acute angle $\alpha$ can be any angle between 30 and 60 degrees. However, in the depicted embodiment, the acute angle $\alpha$ is approximately 45 degrees. The main section 52 is a generally horizontal portion. Although, as shown in FIG. 11, the overall surface contours of main section are not planar. The main section 52 further includes a centrally located latch striker attachment area 64. Further, a first pair 58a of the recessed rib portion 58 are located on one lateral side of the latch striker attachment area 64 and a second pair 58b of the recessed rib portions 58 are located on the other lateral side of the latch striker attachment area 64. Hence, the latch striker attachment area 64 is located between the first pair of the plurality of recessed rib portions 58 and the second pair of the plurality of recessed rib portions 58.

As shown in FIG. 10, the angle $\alpha$ defined by the first pair 58a of the plurality of recessed rib portions 58 is a mirror image (symmetrical) of the angle $\alpha$ defined by the second pair 58b of the plurality of recessed rib portions 58. The first pair 58a of the plurality of recessed rib portions 58 are parallel to one another and the second pair 58b of the plurality of recessed rib portions 58 are parallel to one another. However, the first pair 58a are non-parallel to the second pair 58b, but rather are symmetrical mirror images of one another relative to the latch striker attachment area 64. As is also shown in FIG. 10, the first pair 58a of the plurality of recessed rib portions 58 and the second pair 58b of the plurality of recessed rib portions 58 converge toward one another relative to the vehicle forward direction $D_L$.

Figure 3:
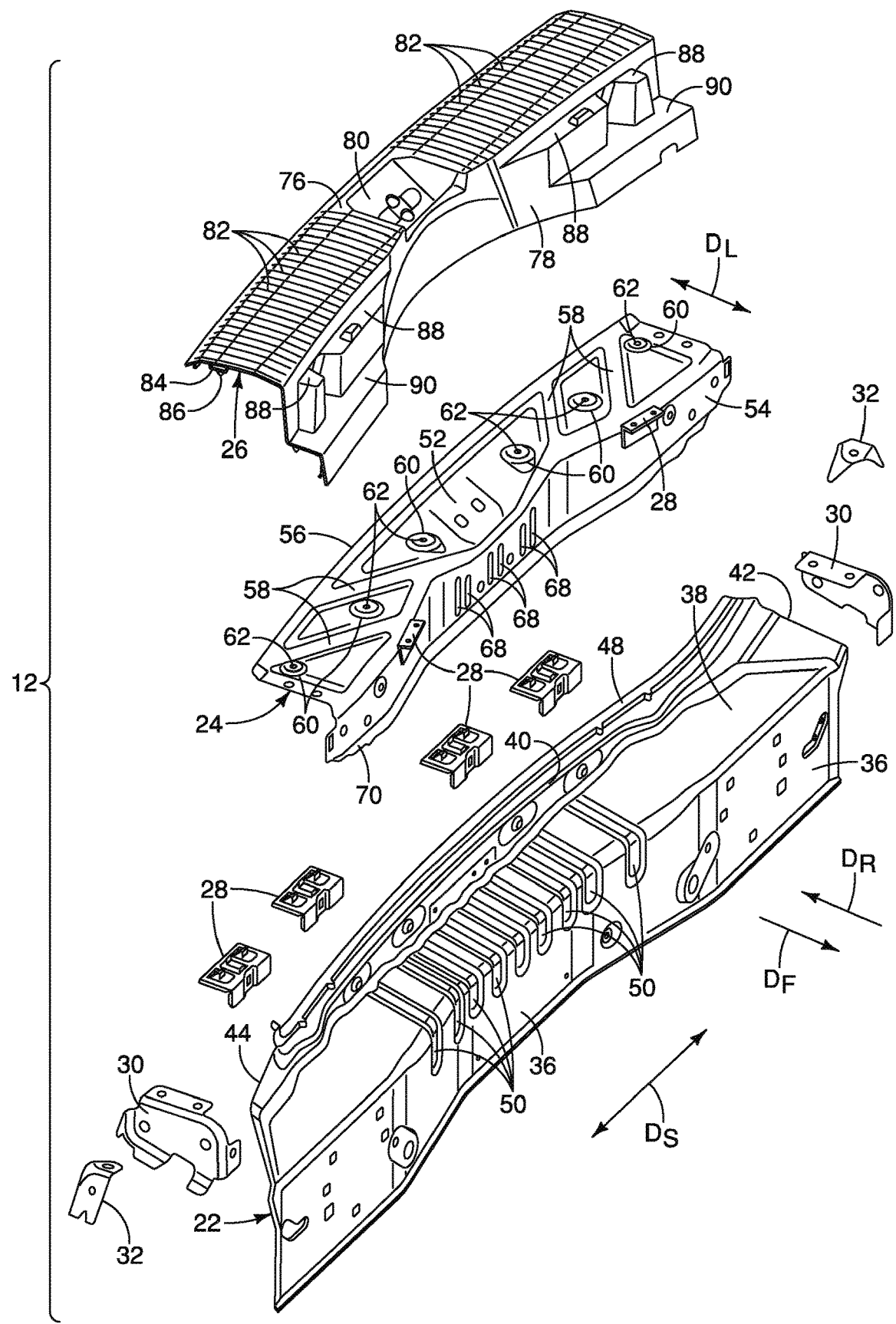
FIG. 3 is a perspective exploded view of the sill assembly removed from the vehicle body structure showing details of the first body panel, the second body panel and the trim panel in accordance with the exemplary embodiment.
Figure 4:
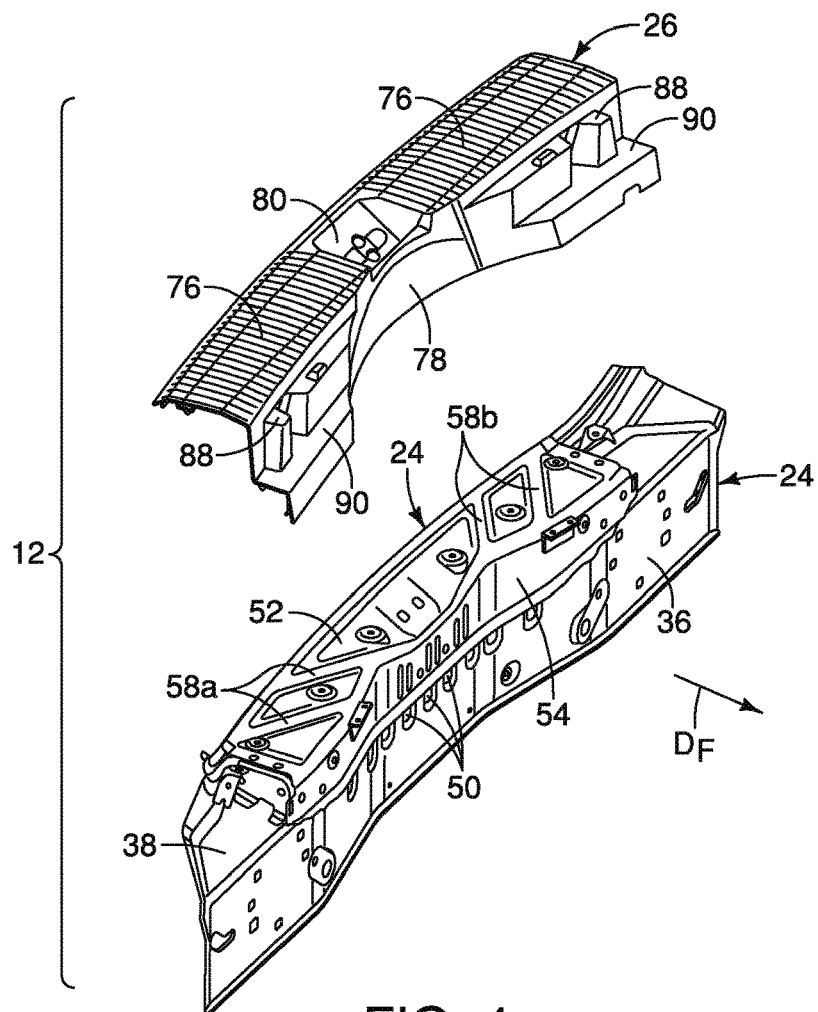
FIG. 4 is another perspective exploded view of the sill assembly removed from the vehicle body structure showing details of the second body panel attached to the first body panel with the trim panel shown above the first and second body panels prior to attachment thereto in accordance with the exemplary embodiment.

As shown in FIGS. 3 and 4, the downwardly extending section 54 of the second body panel 24 extends downward from a forward end of the main section 52. The downwardly extending section 54 includes a plurality of ribs 68, at least two of the attachment brackets 28 and a lower flange 70.

Figure 6:
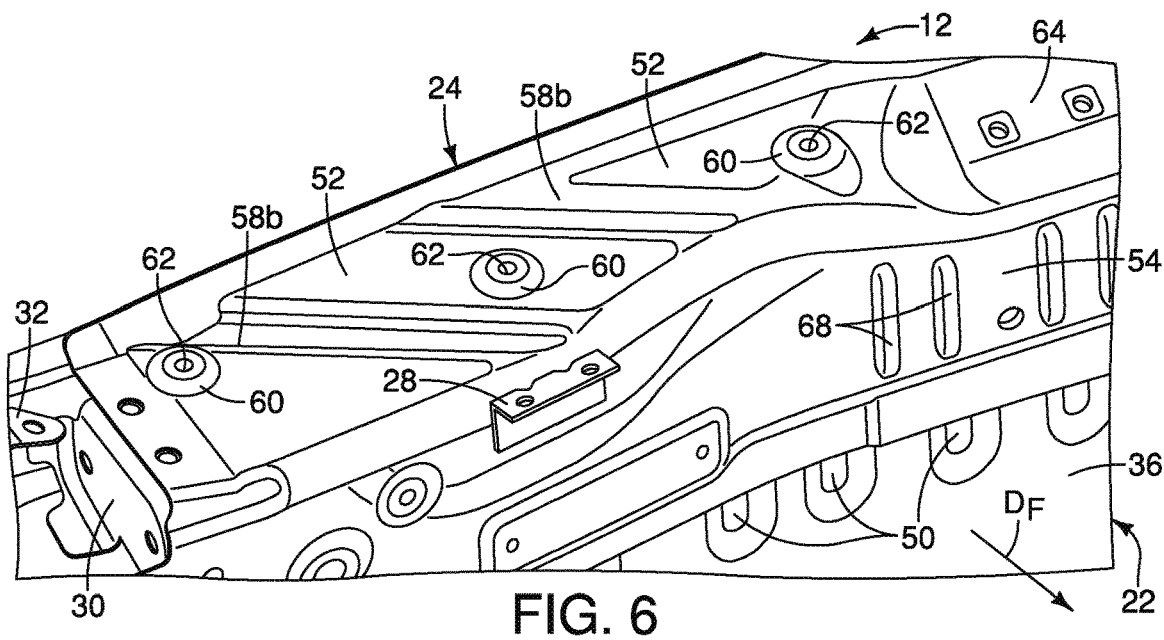
FIG. 6 is a perspective view of a portion of the first and second body panels with the trim panel removed showing a plurality of recessed rib portions and a plurality of raised areas (attachment areas) formed along a main section of the second body panel in accordance with the exemplary embodiment.
Figure 7:
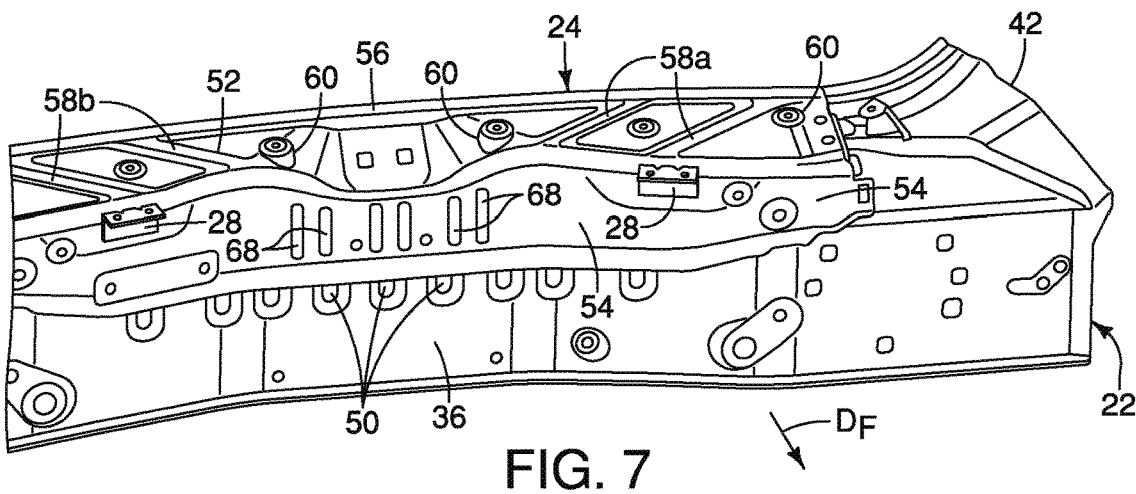
FIG. 7 is another perspective view of the first and second body panels with the trim panel removed showing the plurality of recessed rib portions, the plurality of raised areas and a latch striker attachment area formed along the main section of the second body panel in accordance with the exemplary embodiment.
Figure 8:
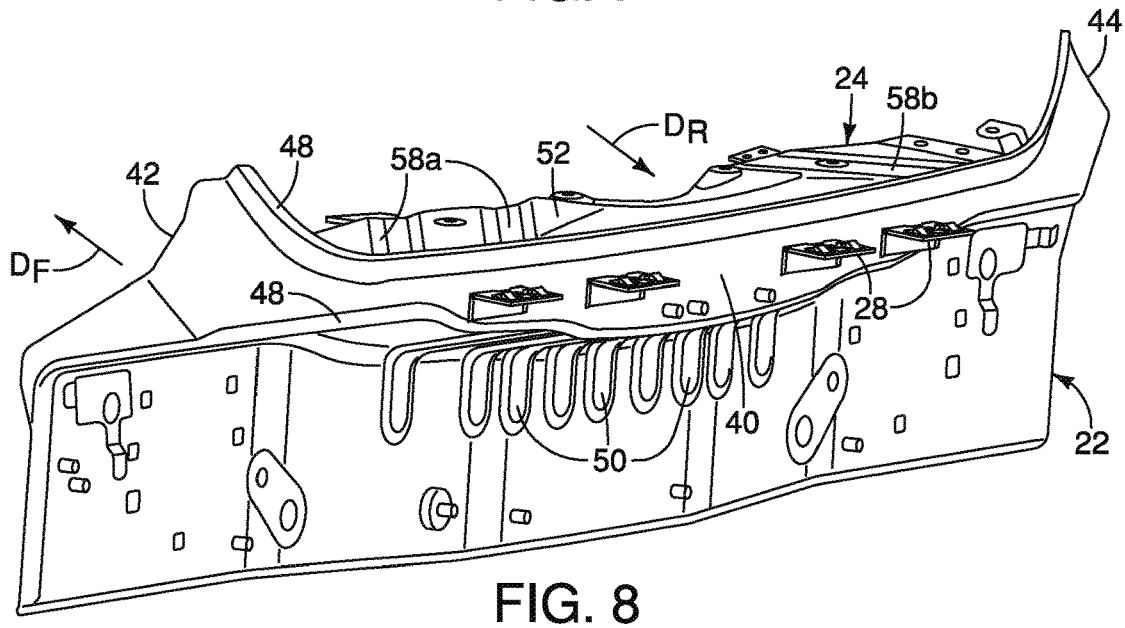
FIG. 8 is still a perspective view of the rear of the vehicle body structure showing the rear sill assembly including the first and second body panels with the trim panel removed showing the plurality of recessed rib portions and the plurality of raised areas of the main section of the second body panel in accordance with the exemplary embodiment.
Figure 9:
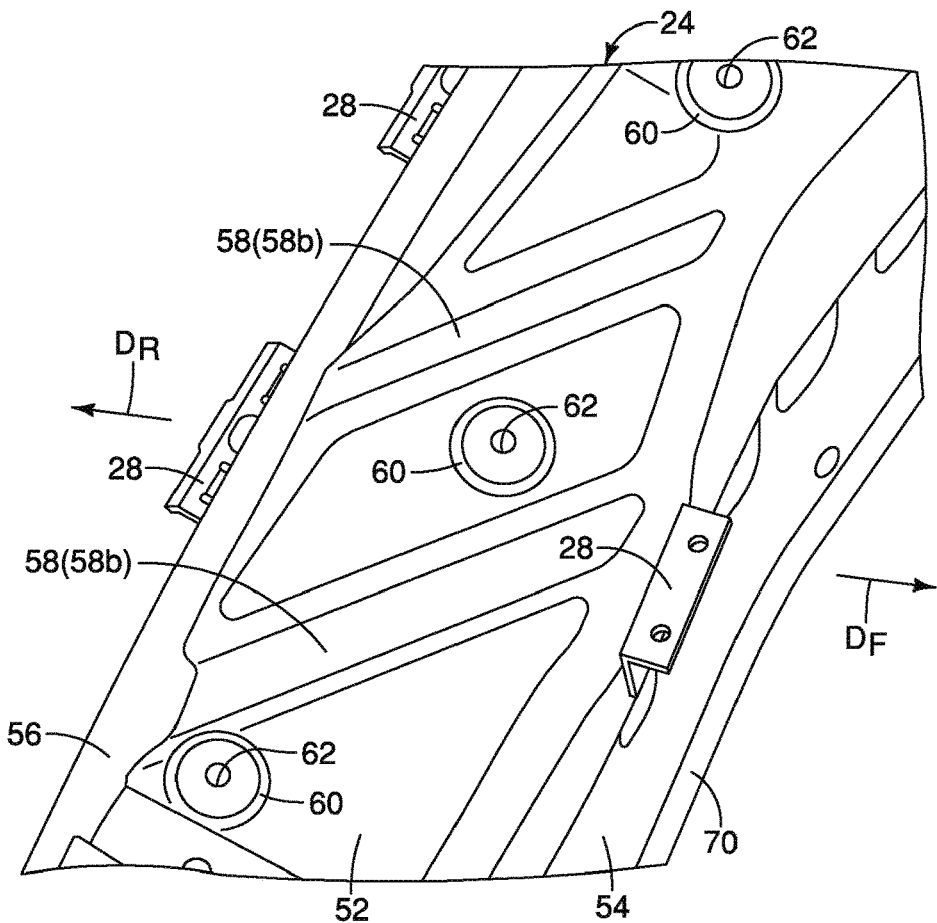
FIG. 9 is another perspective view of the upper surface of the main section of the second body panel of the rear sill structure showing two of the plurality of recessed rib portions and three of the plurality of raised areas in accordance with the exemplary embodiment.
Figure 12:
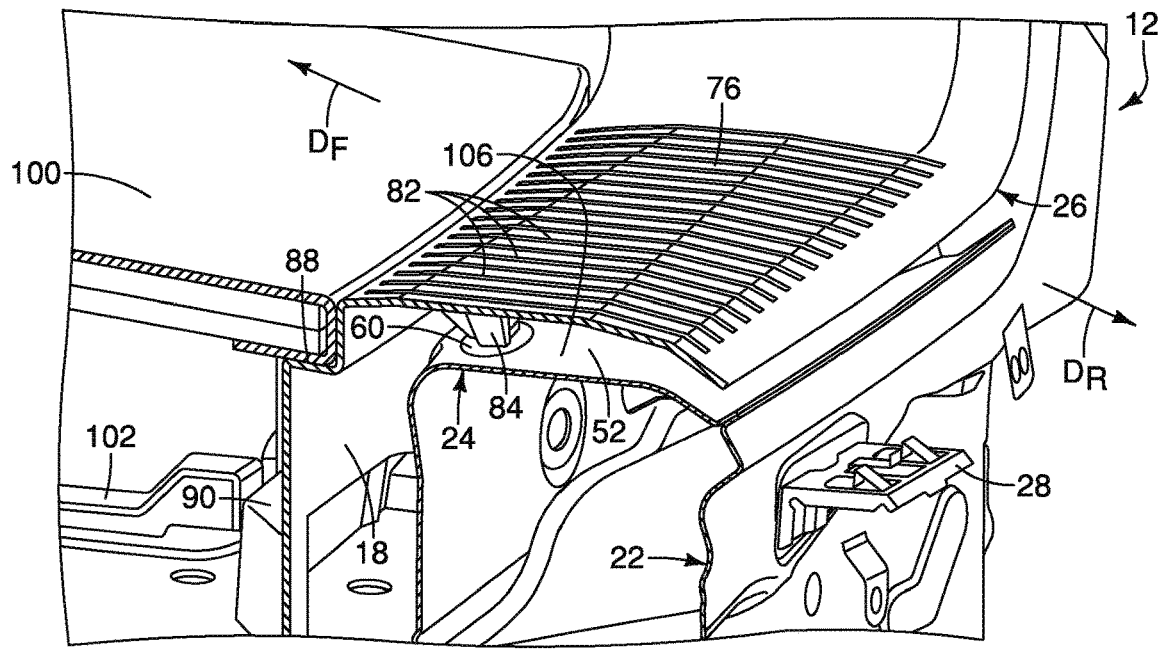
FIG. 12 is another perspective cross-sectional view of the first body panel, the second body panel and the trim panel of the sill assembly of the vehicle body structure showing attachment projections that extend downwardly from the trim panel and include snap-fitting fasteners that extend through openings in the plurality of raised portions of the second body panel attaching the trim panel to the second body panel in accordance with the exemplary embodiment.
Figure 13:
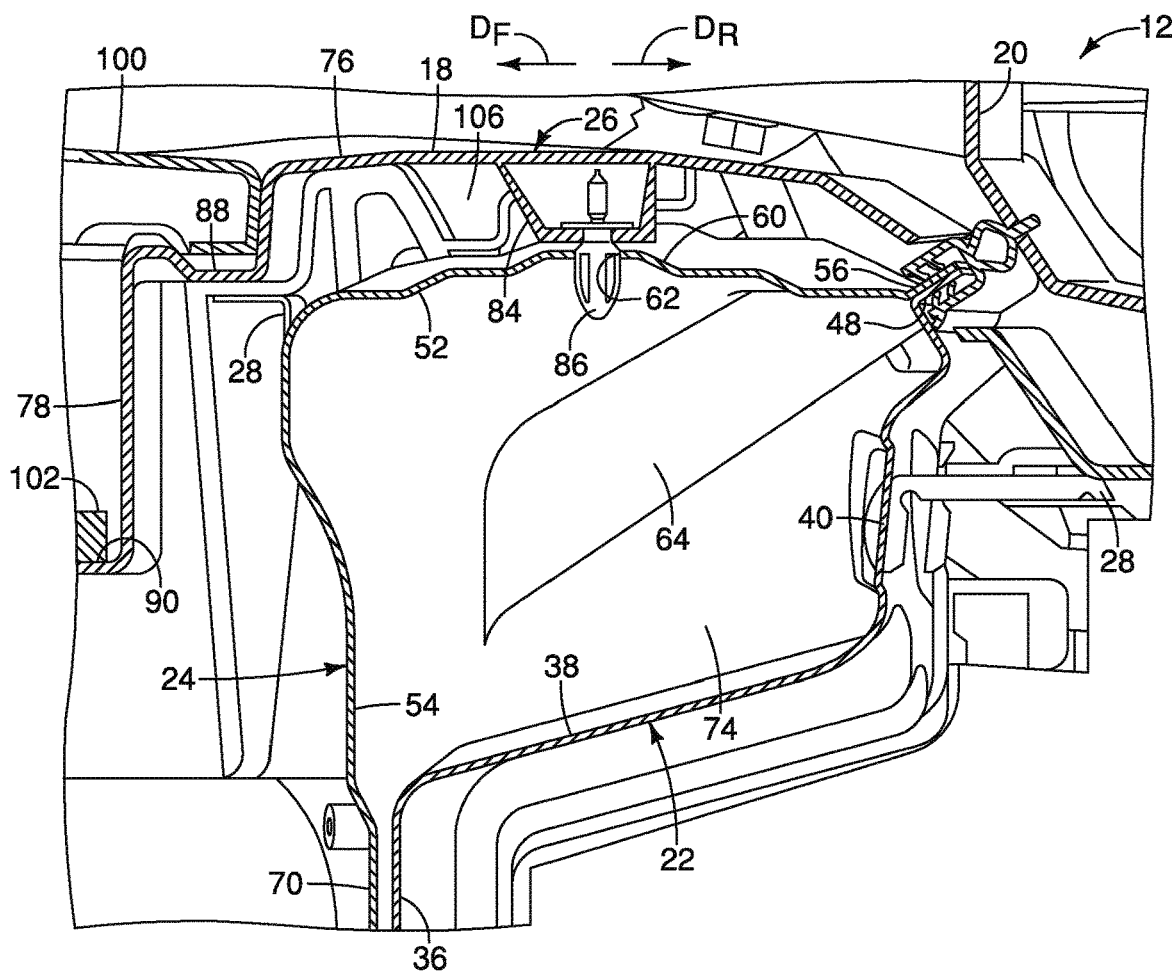
FIG. 13 is a cross-sectional side view of the rear sill assembly showing one of the plurality of attachment projections that extend downwardly from the trim panel with a corresponding one of the snap-fitting fasteners inserted through the opening in the plurality of raised portions of the second body panel thereby fixing the trim panel to the second body panel in accordance with the exemplary embodiment.

During assembly of the rear sill assembly 12 and the vehicle body structure 10, the second body panel 24 overlays a portion of the first body panel 22 defining hollow areas 74 therebetween, as shown in FIGS. 2, 12 and 13. The rearward section 56 of the second body panel 24 overlays and is welded to the upper edge 48 of the first body panel 22. The lower flange 70 of the second body panel 24 is also welded to an upper area of the downwardly extending portion 36 of the first body panel 22. Several of the attachment brackets 28 are attached to respective upper areas of the downwardly extending section 54 of the second body panel 24, as shown in FIG. 6. These attachment brackets 28 serve to support the trim panel 26, as shown in FIGS. 4 and 13.

Thus once fully assembled, the main section 52 (the generally horizontal portion) of the second body panel 24 overlays the horizontal portion 38 of the first body panel 22, and, the downwardly extending portion 54 of the second body pane 24 overlays a section of the downwardly extending portion 36 of the first body panel 22.

As shown in FIGS. 4-5 and 10-11, each of the upright brackets 30 are fixedly attached to an upper surface of the first body panel 22 and a lower surface of the second body panel 24 and respective ends of the second body panel 24, The upright brackets 30 can be fixed in position by mechanical fasteners or via any of a variety of welding techniques. The reinforcement brackets 32 are further fixed to the upright brackets 30 and the upper surface of the first body panel 22.

Figure 5:
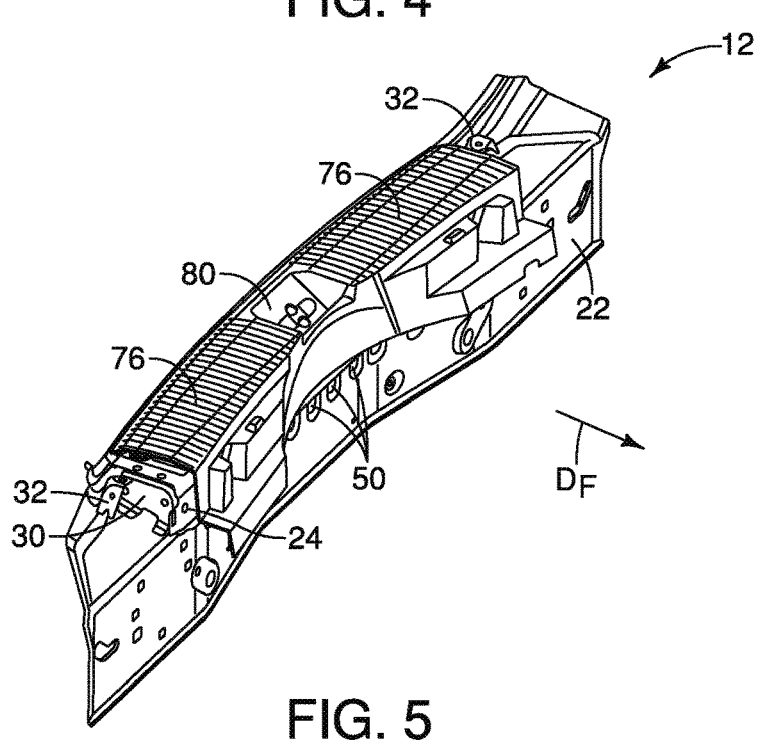
FIG. 5 is a perspective view of the sill assembly removed from the vehicle body structure shown in a fully assembled state in accordance with the exemplary embodiment.

As shown in FIGS. 3-5, the trim panel 26 includes a main section 76 and a downwardly extending section 78. The main section 76 includes a central latch attachment area 80. A plurality of ribs 82 are formed on either lateral side of the central latch attachment area 80. The plurality of ribs 82 that are parallel to one another and extend in the vehicle longitudinal direction $D_L$.

As shown in FIGS. 2-4 and 12-13, a lower surface of the trim panel 26 includes a plurality of attachment projections 84. Each of the plurality of attachment projections 84 include a snap-fitting fastener 86. As shown in FIG. 10, the plurality of raised areas 60 of the second body panel 24 are distributed laterally along the main section 52 of the second body panel 24. Although not shown, the downwardly extending plurality of attachment projections 84 (and corresponding snap-fitting fasteners 86) distributed along the lower surface of the trim panel 26 are aligned with corresponding ones of the plurality of raised areas 60 of the second body panel 24 in a one-to-one correspondence.

The downwardly extending section 78 of the trim panel 26 is located at a forward end of the main section 76. The downwardly extending section 78 includes a first shelf portions 88 and second shelf portions 90. As shown in FIGS. 2 and 12-13, the first shelf portions 88 supports a cargo area shelf 100 and the second shelf portions 90 support a cargo area shelf 102 (concealing a spare tire).

The trim panel 26 is dimensioned and shaped to extend over the second body panel 24 and attach thereto. Specifically, during assembly of the trim panel 26 to the second body panel 24, the snap-fitting projections 86 are inserted into the attachment openings 62 of the second body panel 24, thereby securing the trim panel 26 to the second body panel 24. With the trim panel 26 installed to the second body panel 24, hollow areas 106 are defined between the trim panel 26 and the second body panel 24. The pair of upright brackets 30 attached to opposite ends of the second body panel 24 and the upward facing surface of the first body panel 22 closing the corresponding hollow areas 106.

Further, with the trim panel 26 in position covering the second body panel 24, the second body panel 24 and the plurality of ribs 58 are concealed, and thus are hidden.

The plurality of recessed rib portions 58 (58a and 58b) of the main section 52 of the second body panel 24 being diagonally oriented (defining the acute angle n), add stiffness and strength to the second body panel 52 and rear sill assembly 12, thereby reducing and/or eliminating possible deflections of the second body panel 52 in response to large levels of downward force being applied from above to the rear sill assembly 12.

Further, the trim panel 26 is supported to the second body panel 24 via the plurality of snap-fitting fastener 86 of the plurality of attachment projections 84 that extend through respective attachment openings 62 of the plurality of raised areas 60. Consequently, any large forces or heavy materials placed on the trim panel 26 have corresponding forces distributed to the second body panel 24 via the connection between the plurality of attachment projections 84 of the trim panel 26 and the plurality of raised areas 60 of the second body panel 24. As shown in FIGS. 3-4 and 6-10, the raised areas 60 are located adjacent to one of diagonally oriented plurality of recessed rib portions 58 or are located between adjacent ones of the recessed rib portions 58. The outboard-most raised areas 60 of the second body panel 24 are located between one of the upright brackets 30 and an adjacent one of the recessed rib portions 58.

The inclusion of the recessed rib portions 58 angularly offset by the acute angle α stiffens the second body panel 24 reducing and/or eliminating deflections caused by large forces transmitted by the trim panel 26 to the second body panel 24. Thus, "oil canning" noises are reduced or eliminated.

The vehicle body structure includes various elements, features and structural members (other than the rear sill structure 12) that are conventional components well known in the art. Since such elements, features and structural members are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above". "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure defining a vehicle longitudinal direction and a vehicle lateral direction perpendicular to the vehicle longitudinal direction, comprising:
a rear sill assembly that at least partially defines a rear opening, the rear sill assembly extending in the vehicle lateral direction, the rear sill assembly including:
a first body panel that extends from a first side of the rear opening to a second side of the rear opening; and
a second body panel overlaying a portion of the first body panel, the second body panel having a main section that includes a plurality of recessed rib portions that extend in directions that define an acute angle relative to the vehicle longitudinal direction.

2. The vehicle body structure according to claim 1, wherein
the main section of the second body panel has a first pair of the plurality of recessed rib portions and a second pair of the plurality of recessed rib portions.

3. The vehicle body structure according to claim 2, wherein
the main section of the second body panel further includes a latch striker attachment area located between the first pair of the plurality of recessed rib portions and the second pair of the plurality of recessed rib portions.

4. The vehicle body structure according to claim 2, wherein
the first pair of the plurality of recessed rib portions are parallel to one another, and
the second pair of the plurality of recessed rib portions are parallel to one another.

5. The vehicle body structure according to claim 2, wherein
the first pair of the plurality of recessed rib portions are non-parallel with the second pair of the plurality of recessed rib portions.

6. The vehicle body, structure according to claim 5, wherein
the first pair of the plurality of recessed rib portions and the second pair of the plurality of recessed rib portions converge toward one another relative to a vehicle forward direction defined by the vehicle body structure.

7. The vehicle body structure according to claim 1, thither comprising
a trim panel dimensioned and shaped to extend over the second body panel and attach thereto.

8. The vehicle body structure according to claim 7, wherein
the trim panel includes a plurality of ribs.

9. The vehicle body structure according to claim 7, further comprising
the plurality of ribs of the trim panel are parallel to one another and extend in the vehicle longitudinal direction.

10. The vehicle body structure according to claim 7, wherein
the second body panel includes a plurality of attachment openings, and
the trim panel includes a plurality of attachment projections that extend into corresponding ones of the plurality of attachment openings thereby securing the trim panel to the second body panel.

11. The vehicle body structure according to claim 10, wherein
the second body panel includes a plurality of raised portions with the plurality of attachment openings being defined by corresponding ones the plurality of raised portions, and,
the trim panel includes a plurality of downwardly extending projections with the plurality of attachment projections extending downwardly from corresponding ones of the plurality of downwardly extending projections.

12. The vehicle body structure according to claim 1, further comprising
a plurality of rear support bracket attached to a rearward facing portion of the first body panel.

13. The vehicle body structure according to claim 1, further comprising
a plurality of front support bracket attached to a forward facing portion of the first body panel.

14. The vehicle body structure according to claim 1, further comprising
a pair of upright brackets attached to opposite ends of the second body panel and an upward facing surface of the first body panel.

15. The vehicle body structure according to claim 1, wherein
the first body panel and the second body panel include respective portions that are spaced apart from one another defining corresponding hollow areas.

16. The vehicle body structure according to claim 15, further comprising
a pair of upright brackets attached to opposite ends of the second body panel and an upward facing surface of the first body panel closing the corresponding hollow areas.

17. The vehicle body structure according to claim 1, wherein
the first body panel includes a horizontal portion and a downwardly extending portion, and
the second body panel includes a generally horizontal portion and a downwardly extending portion, the generally horizontal portion of the second body panel overlays the horizontal portion of the first body panel, and the downwardly extending portion of the second body panel overlays a section of the downwardly extending portion of the first body panel.

18. The vehicle body structure according to claim 1, wherein
the main section of the second body panel is defined along the generally horizontal portion thereof, with the plurality of recessed rib portions extending along the generally horizontal portion.

19. The vehicle body structure according to claim 16, wherein
the main section of the second body panel has a first pair of the plurality of recessed rib portions and a second pair of the plurality of recessed rib portions,
the first pair of the plurality of recessed rib portions are parallel to one another, and
the second pair of the plurality of recessed rib portions are parallel to one another.

20. The vehicle body structure according to claim 19, wherein
    the first pair of the plurality of recessed rib portions and the second pair of the plurality of recessed rib portions converge toward one another relative to a vehicle forward direction defined by the vehicle body structure.

* * * * *